No. 723,443. PATENTED MAR. 24, 1903.
F. H. DANIELS.
MELTING FURNACE.
APPLICATION FILED JUNE 9, 1902.
NO MODEL.
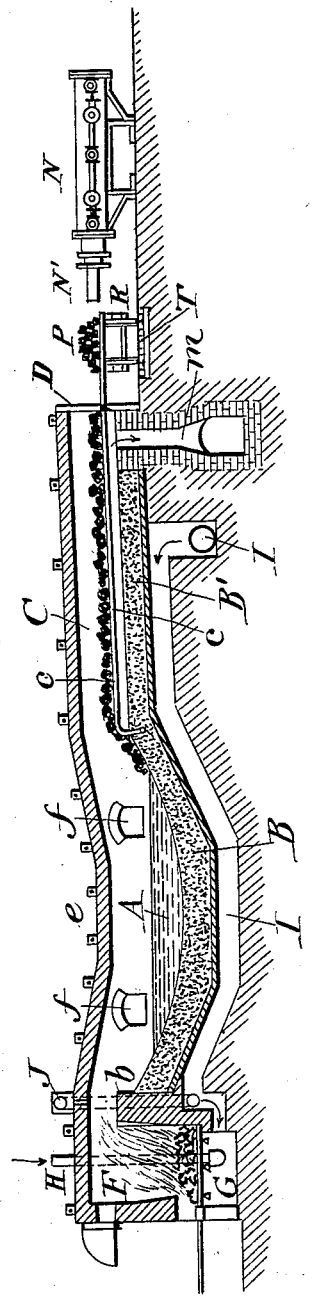
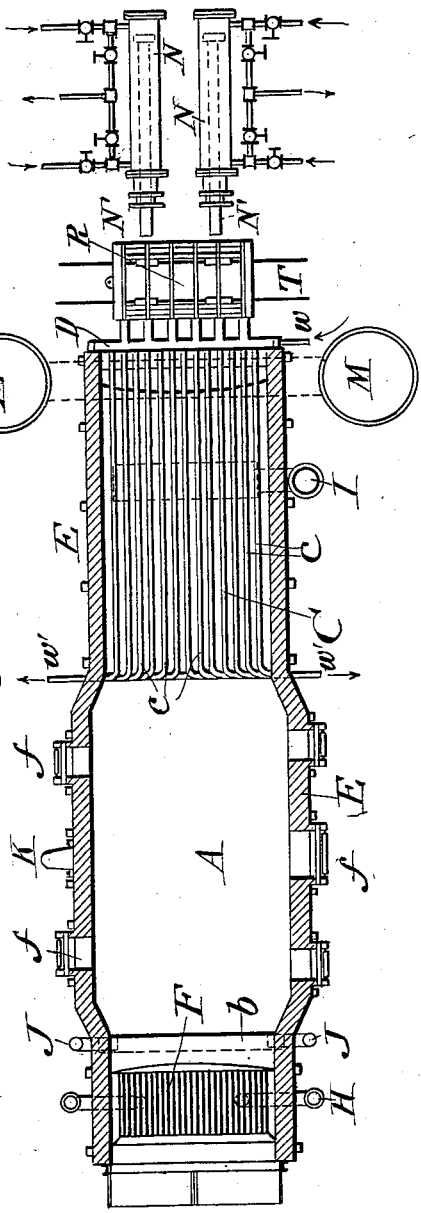
Witnesses:
Chas. J. O'Neill
J. M. Strenn
Inventor:
F. H. Daniels
By his attys,
Rennie & Goldsborough

UNITED STATES PATENT OFFICE.

FRED H. DANIELS, OF WORCESTER, MASSACHUSETTS.

MELTING-FURNACE.

SPECIFICATION forming part of Letters Patent No. 723,443, dated March 24, 1903.

Application filed June 9, 1902. Serial No. 110,809. (No model.)

*To all whom it may concern:*

Be it known that I, FRED H. DANIELS, a citizen of the United States, residing at Worcester, county of Worcester, and State of Massachusetts, have invented certain new and useful Improvements in Melting-Furnaces; and I do hereby declare the following to be a full, clear, and exact description of the invention, such as will enable others skilled in the art to which it appertains to make and use the same.

The object of my present invention is to provide a melting-furnace for steel-making and for other analogous uses having the improved structure herein specified and comprising, in combination, a melting-hearth basin and an annex or preheating-chamber provided with a hearth or bottom composed of a series of water-pipes containing running water, onto which the ingredient substances of which the steel is to be composed or the materials to be melted can be charged in their cold condition through a door at the end of the chamber and there supported and preheated by the escaping products of combustion before depositing said materials in the melting-basin, wherein the substances are melted and converted into steel; also to afford an efficient means for charging the materials from a delivery-car into the furnace, as hereinafter specified. These objects I attain by a furnace constructed substantially as shown in the drawings and hereinafter explained.

Figure 1 represents a vertical central section, and Fig. 2 a plan or horizontal section, of a melting-furnace embodying my invention.

The drawings show a furnace adapted for making steel by the open-hearth process, together with means for mechanically charging the material into the furnace from a delivering-car run upon a tramway adjacent to the charging-door.

In my invention the furnace is made with a melting-basin hearth A or main chamber, the floor of which is depressed or basin-shaped, as at B, and with an annex or preheating-chamber C, the floor of which is at higher level and composed of a series of water-pipes $c$, that overlay the bottom or bed of fire-brick B' and constitute a floor of closely-arranged sections having relatively narrow longitudinal spaces between adjacent pipes of the series, said series of pipes extending from the rear edge of the melting-basin A to the outer end of the preheating-chamber C, where the charging-door D is located. The pipes $c$ are carried through the walls of the furnace at their ends and properly connected with a supply-main, so that a current of running water is maintained therein, entering at $w$ and discharging at $w'$, for preserving this tubular way from destruction from overheat. The walls E and reverberatory arch $e$ can be constructed and stayed in the usual manner.

F indicates the fire-box or gas-producer, located at the front of the melting-chamber and centrally separated therefrom by the bridge-wall $b$, and I the air-blast passage carried beneath the bed B B' for heating the blast and opening into the fire-box beneath the grate G, also having a branch J, that opens through the arch above the bridge-wall for supplying air to the gas. H indicates a pipe for delivering steam to the fire-box below the grate.

The usual doors $f$ for access to the furnace-chamber are provided; also, suitable facilities at K for drawing off the melted product from the basin A.

The exit-flue $m$, which leads from the preheating-chamber near the charging-door, is best arranged to carry the product of combustion downward and laterally and then up through upright steam-generating boilers, located as indicated at M on Fig. 2, or for heating air hot for combustion of the gases.

N N indicate the mechanical charging apparatus or hydraulic cylinders, with plungers N', adapted for pushing the raw materials P from a delivering-car R, standing on the tramway T adjacent to the charging-door D, through said door into the preheating-chamber, where it is supported on the water-piped floor, as indicated in Fig. 1.

With apparatus organized as above described a train-load of material sufficient for one batch of steel can be delivered from the stock-yard, the first car or cars bearing the pig-iron and the following cars bearing old rails, crop ends, or miscellaneous scrap drawn up outside the feed-door D and without rehandling charged into the furnace by the hydraulic pushers. The load of pig-iron is first pushed into the chamber C, forming a continuous layer of material, which is supported on the piped floor of the preheating-chamber. The proximity of the pipes constituting the floor renders it unnecessary to observe particular care in charging the pig-iron and miscellaneous scrap-iron, as the narrow space between adjacent pipes prevents any of the material dropping between the pipes. When the melting-hearth A is hot enough or in proper condition to receive the charge, a second car-load of material is pushed into the chamber as fast as required, pushing the material ahead until it falls piece by piece from the piped floor to the melting-hearth basin highly heated and ready to melt on the melting-hearth. As this becomes melted and the proper time arrives more material is pushed in, and so on until the entire charge is in the melting-basin of the furnace. A second charge or heat can follow in time to take the place of the first charge as soon as it is tapped or drawn off and the necessary repairs are made.

The facilities afforded by the preheating-chamber having the water-piped floor or bottom overlay c renders it convenient and possible to perform the operations of charging, preheating, melting, and converting into steel with practical success, provides an economical and durable furnace, and enables the workings of the furnace to be conducted in a more rapid and efficient manner.

I claim as my invention herein to be secured by Letters Patent—

1. The within-described improved melting-furnace comprising the main chamber, its floor downwardly curved forming a melting-basin, the annexed preheating-chamber provided with a floor composed of a series of adjacently-disposed water-pipes that overlay the bed of fire-brick, and upon which the cold materials are charged and moved forward, said pipes being so arranged as to permit the feeding of miscellaneous scrap, and a power-operated charging device adapted for moving the materials along the pipe-floor into said melting-basin, substantially as set forth.

2. In combination, substantially as described, the furnace comprising the fire-box, the main chamber, its floor forming a melting-basin, with facilities for drawing the melted metal therefrom, the preheating-chamber or annex extending from said basin toward the exit-flue, and having its floor overlaid with water-pipes for supporting the materials charged, said pipes being so arranged as to permit the feeding of miscellaneous scrap, the feed-door at the outer end thereof, the stock-car and tramway adjacent to said feed-door, and a mechanical charger disposed opposite said feed-door adapted for transferring the car-load of material from said stock-car into the preheating furnace-chamber, for the purpose set forth.

3. A concave melting-furnace for making steel, comprising a melting-basin, a fire-box at the front thereof, a backwardly-extending preheating-chamber having its bottom overlaid with a series of adjacent longitudinally-disposed water-pipes, said pipes being so arranged as to permit the feeding of miscellaneous scrap, and a charging-door at the outer end of said chamber, the downward exit-flue leading through the floor of said preheating-chamber adjacent to said door, all combined substantially as set forth.

In testimony whereof I affix my signature in presence of two witnesses.

FRED H. DANIELS.

Witnesses:
W. H. MORSE,
JAMES W. SMITH.